(12) United States Patent
Jang et al.

(10) Patent No.: US 7,391,167 B2
(45) Date of Patent: Jun. 24, 2008

(54) BACKLIGHT ASSEMBLY, DISPLAY DEVICE AND DRIVING APPARATUS OF LIGHT SOURCE FOR DISPLAY DEVICE

(75) Inventors: Hyeon-Yong Jang, Osan-si (KR); Min-Gyu Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 11/124,757

(22) Filed: May 9, 2005

(65) Prior Publication Data
US 2005/0253537 A1    Nov. 17, 2005

(30) Foreign Application Priority Data
May 11, 2004  (KR) ...................... 10-2004-0032959

(51) Int. Cl.
*H05B 37/02* (2006.01)
(52) U.S. Cl. ............ 315/291; 315/209 R; 315/307
(58) Field of Classification Search ............ 315/291, 315/294, 209 R, 307–308, 312–318, 224–226; 345/82–90, 102
See application file for complete search history.

(56) References Cited

U.S. PATENT DOCUMENTS

| | | | | |
|---|---|---|---|---|
| 5,491,387 A * | 2/1996 | Saito | ............ | 315/307 |
| 5,747,947 A * | 5/1998 | Hak | ............ | 315/308 |
| 5,910,713 A * | 6/1999 | Nishi et al. | ............ | 315/308 |
| 5,952,793 A * | 9/1999 | Nishi et al. | ............ | 315/307 |
| 6,583,456 B2 * | 6/2003 | Haga et al. | ............ | 257/292 |
| 6,947,024 B2 * | 9/2005 | Lee et al. | ............ | 345/102 |
| 6,954,364 B2 * | 10/2005 | Min | ............ | 363/56.08 |
| 2003/0234762 A1* | 12/2003 | Nakatsuka et al. | ............ | 345/102 |
| 2005/0116662 A1* | 6/2005 | Sanchez | ............ | 315/225 |
| 2005/0242789 A1* | 11/2005 | Kang | ............ | 323/224 |
| 2005/0269963 A1* | 12/2005 | Komatsu et al. | ............ | 315/209 R |
| 2007/0103094 A1* | 5/2007 | Hachisuka et al. | ............ | 315/291 |

FOREIGN PATENT DOCUMENTS

JP        2002141186        5/2002

* cited by examiner

*Primary Examiner*—Thuy V. Tran
*Assistant Examiner*—Tung X Le
(74) *Attorney, Agent, or Firm*—Cantor Colburn LLP

(57) ABSTRACT

A backlight assembly device includes lamps, an inverter, a sensing unit, a normal lighting determiner and an inverter controller. The inverter applies a control signal to the lamps to control operation of the lamps. The sensing unit outputs sensing voltages in response to currents flowing in the lamps. The normal lighting determiner compares the sensing voltages to a reference voltage for determining an operating state of the lamps to output a determination signal and varies the reference voltage in response to a change in the operating state of the lamps. The inverter controller outputs the control signal in response to the determination signal.

24 Claims, 9 Drawing Sheets

1

BACKLIGHT ASSEMBLY, DISPLAY DEVICE AND DRIVING APPARATUS OF LIGHT SOURCE FOR DISPLAY DEVICE

The present application claims priority from Korean Patent Application No. 2004-0032959, filed on May 11, 2004, the disclosure of which is hereby incorporated herein by reference in its entirety.

BACKGROUND OF THE INVENTION (a) Field of the Invention

The present invention relates to a backlight assembly, a display device and a driving apparatus of a light source for the display device.

(b) Description of Related Art

Display devices used for monitors of computers and television sets generally include either self-emitting display devices such as organic light emitting displays (OLEDs), vacuum fluorescent displays (VFDs), field emission displays (FEDs), and plasma panel displays (PDPs), or non-emitting display devices such as liquid crystal display (LCD) devices requiring an external light source.

An LCD device includes two panels provided with field-generating electrodes and a liquid crystal (LC) layer having dielectric anisotropy disposed between the two panels. The field-generating electrodes are supplied with voltages to generate an electric field across the LC layer, and a light transmittance of the LC layer varies in response to a strength of the electric field, which is controlled by the voltages supplied. Accordingly, desired images are displayed by adjusting the voltages supplied. The external light source for the LCD devices may be an artificial light source that is installed in the LCD devices or natural light.

The artificial light source, which is part of a backlight assembly, is often implemented with a plurality of fluorescent lamps that are connected to a plurality of inverters for driving each of the lamps. Each of the inverters receives a DC (direct current) input voltage from an external source and converts it to an AC (alternating current) voltage, which is applied to each of the lamps to turn on each of the lamps and to control brightness of each of the lamps. The AC voltage may be stepped up by a transformer prior to being applied to each of the lamps. The inverter also senses a monitored voltage related to a current flowing through each of the lamps and controls the AC voltage applied to each of the lamps based on the monitored voltage.

The lamps may be disposed under an LC panel assembly, such as in a direct-type backlight assembly, or may be disposed along one or more edges of the LC panel assembly, such as in an edge-type backlight assembly.

As explained above, the conventional artificial light sources require several peripheral devices such as inverters and sensors, which undesirably increase manufacturing cost.

SUMMARY OF THE INVENTION

A backlight assembly device comprising lamps; an inverter applying a control signal to the lamps to control operation of the lamps; a sensing unit outputting sensing voltages in response to currents flowing in the lamps; a normal lighting determiner comparing the sensing voltages to a reference voltage for determining an operating state of the lamps to output a determination signal and varying the reference voltage in response to a change in the operating state of the lamps; and an inverter controller outputting the control signal in response to the determination signal.

A display device comprising: pixels; a light source having lamps; an inverter applying a control signal to the lamps and controlling the lamps; a sensing unit outputting sensing voltages in response to currents flowing in the lamps; a normal lighting determiner comparing the sensing voltages to a reference voltage for determining an operating state of the lamps to output a determination signal and varying the reference voltage in response to a change in the operating state of the lamps; and an inverter controller outputting the control signal in response to the determination signal.

A driving apparatus of a light source for a display device including a plurality of pixels, the light source including a plurality of lamps, the apparatus comprising: an inverter applying a control signal to the lamps and controlling the lamps; a sensing unit outputting sensing voltages in response to currents flowing in the lamps; a normal lighting determiner comparing the sensing voltages to a reference voltage for determining an operating state of the lamps to output a determination signal and varying the reference voltage in response to a change in the operating state of the lamps; and an inverter controller outputting the control signal in response to the determination signal.

The sensing unit may comprise sensors generating excited voltages in response to the currents flowing in the lamps to output as the sensing voltages, and a substrate having signal lines and transmitting the excited voltages through the signal lines.

Each sensor may be made of a metal plate sensor.

The normal lighting determiner may comprise a first voltage divider, an adder, a voltage selector and a logic circuit. The first voltage divider divides the sensing voltages to output divided voltages. The adder adds the divided voltages to output an added voltage. The voltage selector selects one of the added voltage and a power supply voltage to output as a supply voltage. The logic circuit is receptive of the supply voltage and generates the determination signal.

The backlight assembly device may further comprise a power supply source applying the power supply voltage to the voltage selector. The power supply source comprises a second voltage divider.

The voltage selector may comprise a first diode electrically connected to the adder and a second diode electrically connected to the power supply source.

The first voltage divider may comprise a plurality of first resistors and a second resistor electrically connected the first resistors.

The adder may comprise an input resistor, a feedback resistor, a feedback capacitor, an output capacitor, and an operational amplifier having a negative feedback connection through the feedback resistor and the feedback capacitor.

The logic circuit may be a NAND gate. Moreover, the lamps may comprise EEFLs.

BRIEF DESCRIPTION OF THE DRAWINGS

The present invention will become more apparent by describing preferred embodiments thereof in detail with reference to the accompanying drawings in which.

DETAILED DESCRIPTION OF THE INVENTION

Figure 1:
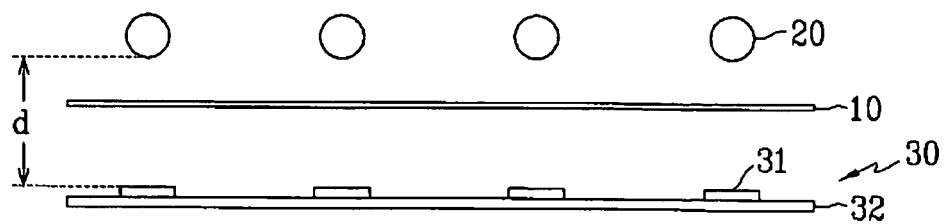
FIG. 1 is a sectional view of a backlight assembly for an LCD according to an exemplary embodiment of the present invention.

The present invention now will be described more fully hereinafter with reference to the accompanying drawings, in which exemplary embodiments of the invention are shown.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

A liquid crystal display according to an exemplary embodiment of the present invention is described below with reference to FIGS. 1-2.

Figure 2:
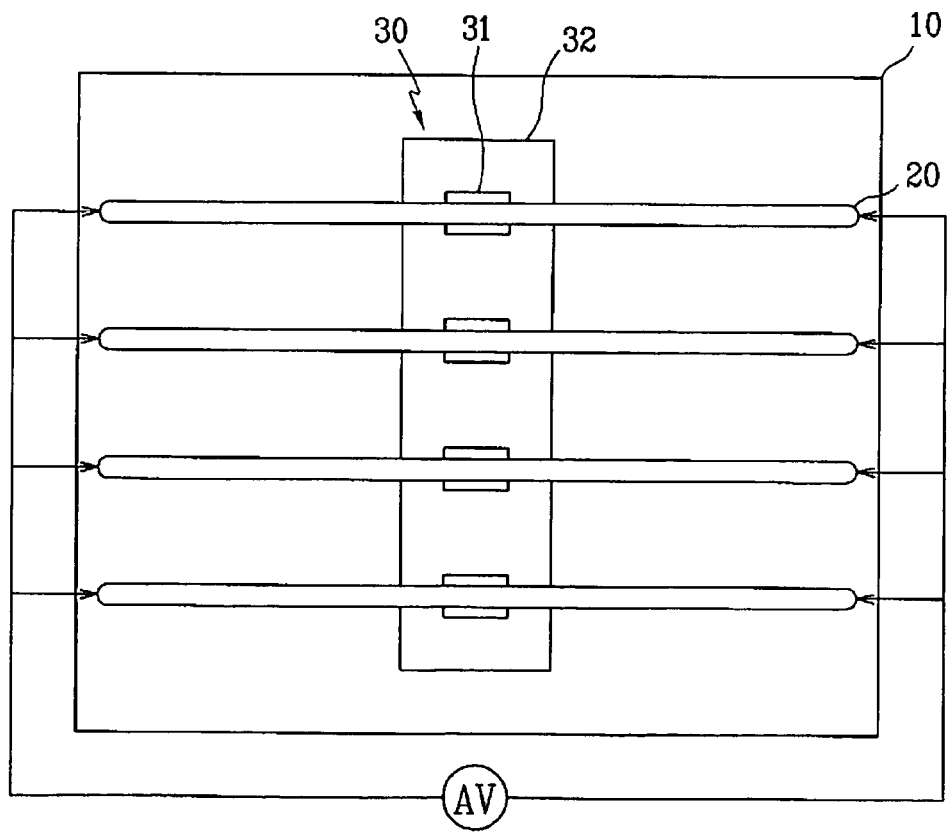
FIG. 2 is a top view of the backlight assembly shown in FIG. 1.

FIG. 1 is a sectional view of a backlight assembly for an LCD according to an exemplary embodiment of the present invention and FIG. 2 is a top view of the backlight assembly shown in FIG. 1.

Referring to FIGS. 1 and 2, the backlight assembly includes a reflecting plate 10, lamps 20 spaced apart from a surface of the reflecting plate 10 by a predetermined distance and arranged substantially parallel to each other, and a metal plate sensing unit 30 disposed at an opposite side of the reflecting plate 10 to the side at which the lamps 20 are disposed. However, it should be noted that the metal plate sensing unit 30 may alternatively be located between the reflecting plate 10 and the lamps 20. The backlight assembly includes an inverter (not shown) applying an AC voltage to the lamps 20 and an inverter controller (not shown) controlling the inverter.

The reflecting plate 10 reflects light that is not emitted toward a desired direction. Light reflected by the reflecting plate 10 is redirected toward the desired direction to enhance light efficiency.

Each lamp 20 emits visible light. For example, when a discharge gas which fills the lamps 20 is electrically discharged by an AC voltage applied to the lamps 20, ultra violet light is generated. The ultra violet light reacts with a fluorescent substance disposed at the lamps. Thus, electrons of the fluorescent substance are excited and generate visible light when returning to a base state. The lamps 20 are preferably external electrode fluorescent lamps (EEFLs) which include exposed electrodes disposed on an external surface of each of the lamps 20. However, the lamps 20 may include cold cathode fluorescent lamps (CCFLs) and/or flat fluorescent lamps (FFLs).

The metal plate sensing unit 30 senses voltages proportional to a voltage powering each of the lamps 20 and includes metal plate sensors 31 and a printed circuit board (PCB) 32. In an exemplary embodiment, the metal plate sensors 31 are disposed such that each one of the metal plate sensors 31 is proximate to a corresponding one of the lamps 20. Signal lines transmitting the voltages sensed by the metal plate sensors 31 to a controller are formed on the PCB 32. In FIG. 1, a reference numeral "d" indicates a distance between each one of the lamps 20 and each corresponding metal plate sensor 31.

Operation of the backlight assembly for the LCD according to this exemplary embodiment of the present invention will be described in detail.

When an AC voltage AV is applied to both terminals of the lamps 20 shown in FIGS. 1 and 2, the lamps 20 are turned on to emit light and, thus, each lamp 20 functions as a resistor. High magnitude currents flow through each of the lamps 20 and induce currents in the metal plate sensors 31. The induced currents in the metal plate sensors 31 create corresponding voltages called excited voltages, which have a magnitude proportional to the AC voltage AV. Since the lamps 20 are conductors having currents flowing through the lamps 20, each lamp 20 and each corresponding metal plate sensor 31 function as a capacitor.

If the lamps 20 are unstably mounted or broken etc, the lamps 20 do not operate normally. In such a case, induced currents in each metal plate sensor 31 corresponding to a broken or unstably mounted lamp are either very small or non-existent, thus the excited voltages are very small or non-existent. Similarly, when the AC voltage AV is not applied to both terminals of the lamps 20, or the lamps 20 are turned off, or not normally mounted or broken, the excited voltages in the metal plate sensors 31 are non-existent or very low voltages due to parasitic capacitance. Thus, by measuring the excited voltages of the metal plate sensors 31, an operating state of the lamps 20 may be determined. The operating state of the lamps 20 is determined by comparing the excited voltages to a predetermined reference voltage.

Figure 3:
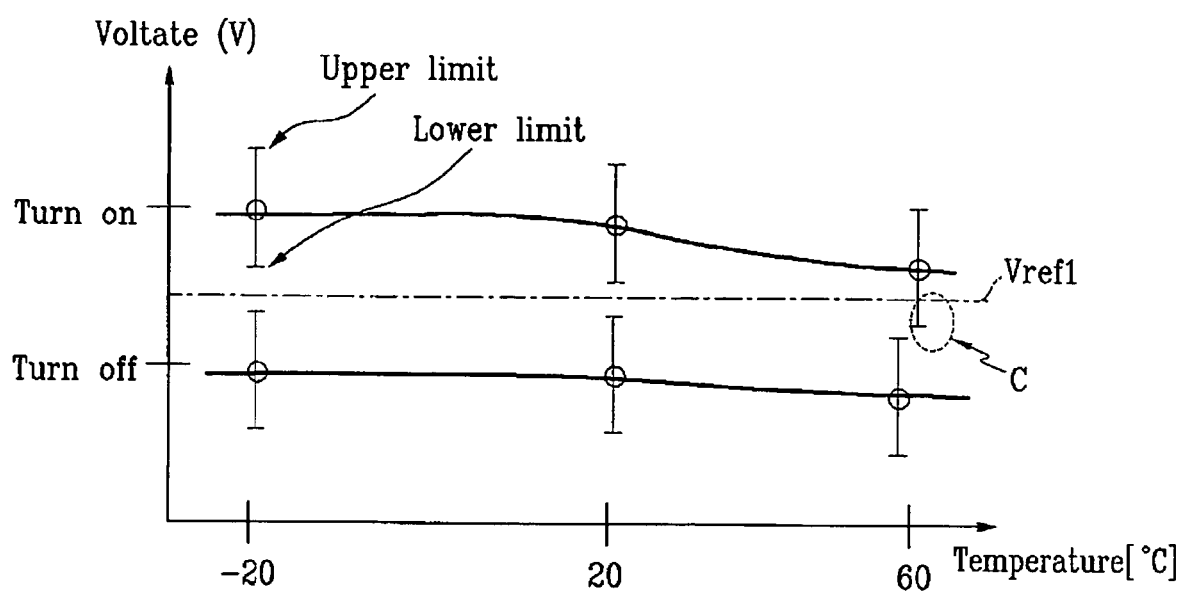
FIG. 3 is a graph illustrating a voltage excited in a metal plate sensor according to an exemplary embodiment of the present invention.

FIG. 3 is a graph illustrating a voltage excited in a metal plate sensor according to this embodiment of the present invention.

Referring to FIG. 3, a reference voltage Vref1, which has a predetermined magnitude that is constant over a range of temperatures, is defined. For example, if the excited voltages are larger than the reference voltage Vref1, the inverter controller (not shown) determines that the lamps 20 are operating normally. However, if the excited voltages are smaller than the reference voltage Vref1, the inverter controller determines that the lamps 20 are turned off. If at least one lamp 20 is not turned off and yet the excited voltages are smaller than the reference voltage Vref1, the inverter controller determines that the lamps 20 are not operating normally. Thus, the inverter controller turns off all of the lamps 20.

As described above, the backlight assembly according to this embodiment of the present invention may determine whether or not the operating state of the lamps 20 is normal by detecting the excited voltages in the metal plate sensors 31 installed under each of the lamps 20 when the lamps 20 are operated by applying the AC voltage AV to each of the lamps 20.

Accordingly, when the lamps 20 are not normally installed or are not normally operated, the AC voltage AV to be applied to the backlight assembly is shut down, to decrease a possibility of arc generation near lamp electrodes and a possibility of defective generation during an assembling process.

If a temperature of the backlight assembly or the lamps 20 rises, the AC voltage AV applied to the lamps 20 tends to decrease. Accordingly, the excited voltages may be decreased. If the distance between each one of the lamps 20 and each corresponding metal plate sensor 31 is not regular due to defects that occurred during assembly of the backlight assembly, or the sensitivity of each of the metal palate sensors 31 is different from each other due to defects in the metal plate sensors 31, the excited voltages tend to decrease. As shown in FIG. 3, the excited voltages decrease as temperature increases. However, even during normal operation, a variation in the excited voltages may occur between an upper limit and a lower limit around a curve showing the excited voltages. Thus, as represented by portion "C" of FIG. 3, although the lamps 20 are operating normally, the excited voltages may be less than the reference voltage Vref1, thereby causing the inverter controller to incorrectly determine the operating state of the lamps 20 as being abnormal. Such an incorrect determination of the operating state of the lamps 20 is caused by a characteristic of the reference voltage Vref1 being fixed.

To improve response to problems introduced by increasing temperature, a backlight assembly according to another exemplary embodiment of the present invention will be described below.

Figure 4:
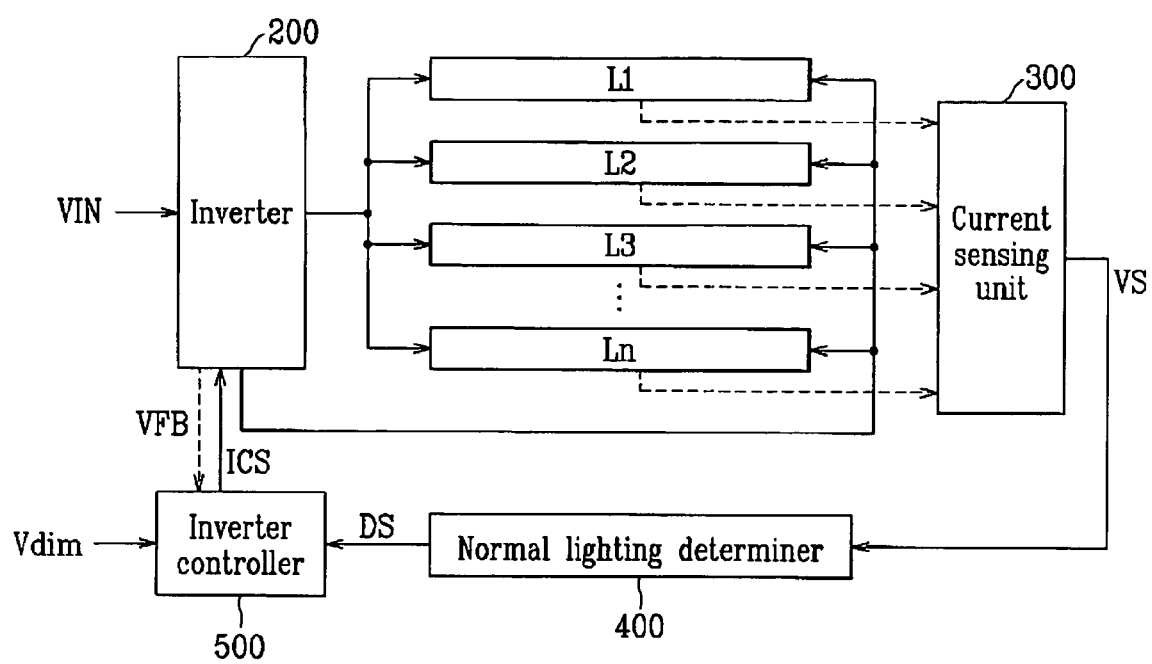
FIG. 4 is a block diagram of a backlight assembly according to an exemplary embodiment of the present invention.

FIG. 4 is a block diagram of a backlight assembly according to an exemplary embodiment of the present invention. In addition, FIG. 5 is a block diagram of a normal lighting determiner of FIG. 4 and FIG. 6 is a circuit diagram of the normal lighting determiner shown in FIG. 5.

Figure 5:
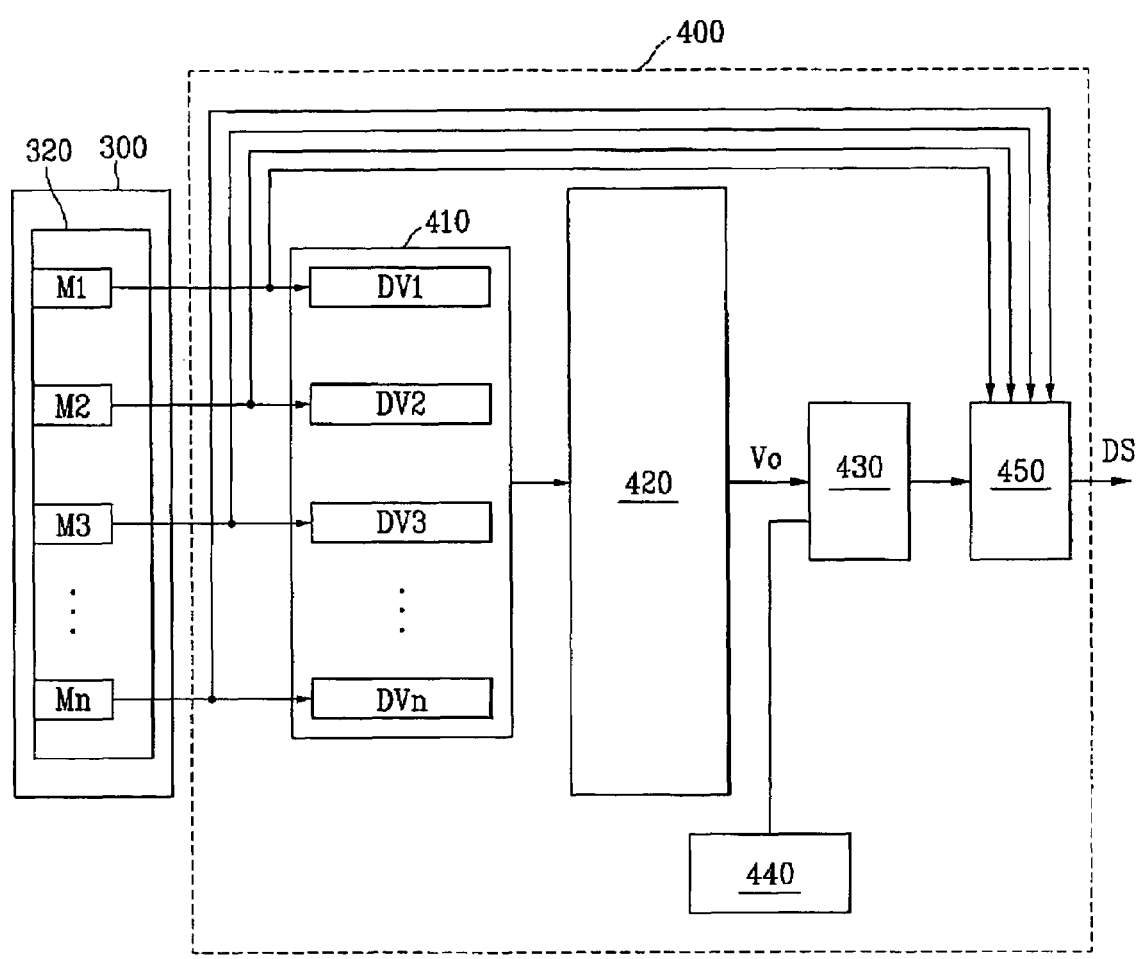
FIG. 5 is a block diagram of a normal lighting determiner of FIG. 4.
Figure 6:
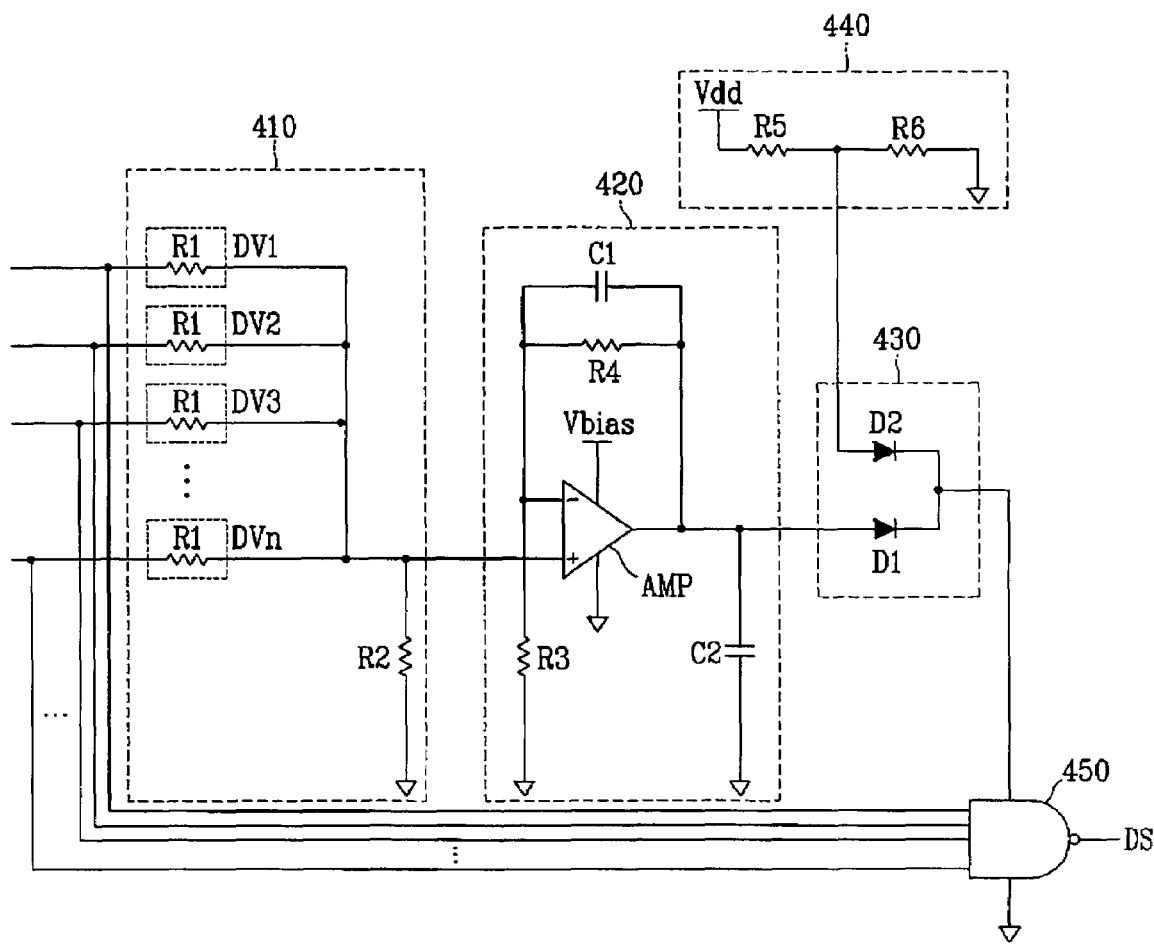
FIG. 6 is a circuit diagram of the normal lighting determiner shown in FIG. 5.

As shown in FIGS. 4 to 6, a backlight assembly according to this embodiment of the present invention includes an inverter 200 and a current sensing unit 300 electrically connected to lamps L1-Ln, a normal lighting determiner 400 electrically connected to the current sensing unit 300, and an inverter controller 500 electrically connected to the normal lighting determiner 400 and the inverter 200.

The inverter 200 converts an inverter operating voltage VIN, a DC voltage, to an AC voltage based on an inverter controlling signal ICS from the inverter controller 500. The inverter 200 then applies the AC voltage to the lamps L1-Ln. In response to the AC voltage, each lamp L1-Ln is turned on or turned off and brightness of the lamps L1-Ln is controlled.

The current sensing unit 300 generates a sensing signal VS in response to excited voltages related to induced currents from the lamps L1-Ln. The current sensing unit 300 applies the sensing signal VS to the normal lighting determiner 400. As shown in FIG. 5, the current sensing unit 300 includes metal plate sensors M1-Mn and a printed circuit board (PCB) 320. The metal plate sensors M1-Mn produce excited voltages responsive to the induced currents in the metal plate sensors M1-Mn from currents in the lamps L1-Ln. The PCB 320 includes signal lines to transmit the excited voltages from the metal plate sensors M1-Mn. Each of the lamps L1-Ln and each of the metal plate sensors M1-Mn are spaced apart from each other by the distance "d," as shown in FIG. 1.

The normal lighting determiner 400 receives the sensing signal VS, determines whether or not the operating state of the lamps L1-Ln is normal by comparing the sensing signal VS to a reference voltage that is varied depending on temperature, and generates a determining signal DS to apply to the inverter controller 500.

As shown in FIGS. 5 and 6, the normal lighting determiner 400 includes a voltage dividing unit 410, an adder 420 electrically connected to the voltage dividing unit 410, a DC power supply source 440, a maximum value selector 430 electrically connected to the adder 420 and the DC power supply source 440, and a NAND gate 450 electrically connected to the maximum value selector 430.

As shown in FIG. 6, the voltage dividing unit 410 includes a reference resistor R2 and voltage dividers DV1-DVn connected to corresponding ones of the metal plate sensors M1-Mn and each having a resistor R1. Each voltage divider DV1-DVn divides the sensing voltage VS from the current sensing unit 300 by using the resistors R1 and the reference resistor R2 connected to a ground voltage.

The adder 420 adds divided voltages from the voltage dividing unit 410. As shown in FIG. 6, the adder 420 includes an input resistor R3, a feedback capacitor C1, an output capacitor C2, and a feedback resistor R4 electrically connected in parallel with the feedback capacitor C1. The resistor R3 and the output capacitor C2 are electrically connected to the ground voltage. The adder 420 also includes an operational amplifier AMP having a non-inverting terminal (+) and an inverting terminal (−), and having a negative feedback connection through the feedback capacitor C1 and the feedback resistor R4.

The operational amplifier AMP receives an output of the voltage dividing unit 410 as a non-inverting input for the non-inverting terminal (+) and is biased between the ground voltage and a bias voltage Vbias (a magnitude of the bias voltage Vbias may be, for example, about 12V). Since an operation of the adder 420 is substantially similar to that of a generic adder, the operation of the adder 420 will be omitted.

When an output voltage from the adder 420 is greater than the reference voltage, the maximum value selector 430 applies the output voltage from the adder 420 to the NAND gate 450, to be used as a supply voltage for the NAND gate 450. As shown in FIG. 6, the maximum value selector 430 includes diodes D1 and D2 electrically connected in parallel with each other. Input terminals of diodes D1 and D2 are electrically connected to the output voltage from the adder 420 and the DC power supply source 440, respectively, and output terminals of diodes D1 and D2 are connected to each other.

The DC power supply source 440 supplies a supply voltage for the NAND gate 450 when the diode D1 is not turned on by the output voltage from the adder 420. Thus, the NAND gate 450 is operated by a minimum supply voltage, i.e. the supply voltage from the DC power supply source 440. The DC power supply voltage source 440 includes a voltage divider having a first resistor R5 and a second resistor R6 connected in series between a supply voltage Vdd and the ground voltage. In this exemplary embodiment, a magnitude of the supply voltage Vdd is about 5V, although the magnitude of the supply voltage Vdd is not limited to a particular value.

The NAND gate 450 is biased between the ground voltage and the output voltage from the maximum value selector 430 and generates an inverted logical product of output voltages from each of the metal plate sensors M1-Mn to output as the determination signal DS. The NAND gate 450 may be a CMOS logic gate, and alternatively, the NAND gate 450 may be replaced by another type of logic gate such as an AND gate, etc.

The inverter controller 500 of FIG. 4 determines whether to turn on or turn off the lamps L1-Ln in response to the determination signal DS from the normal lighting determiner 400. Moreover, the inverter controller 500 pulse width modulates a dimming control voltage Vdim from an external device to control on and off durations of the lamps L1-Ln. In addition, the inverter controller 500 receives a feedback signal VFB related to an output voltage from the inverter 200 and generates an inverter control signal ICS for controlling the inverter 200 so that the total current applied to the lamps L1-Ln is constant.

Operation of the backlight assembly according to this embodiment of the present invention will now be described in detail.

First, the inverter 200 converts the inverter operating voltage VIN to the AC voltage in response to the inverter controlling signal ICS, to apply the AC voltage to the lamps L1-Ln. The lamps L1-Ln are turned on by the AC voltage and electrical discharge of the discharge gas in each of the lamps L1-Ln produces visible light.

The current sensing unit 300 senses the excited voltages related to the induced currents in the metal plate sensors M1-Mn responsive to the current in each of the lamps L1-Ln. If the lamps L1-Ln are operating normally, a magnitude of the excited voltages is greater than a predetermined voltage so that states of the excited voltages are at a high level. During a time that the lamps L1-Ln are operating normally, the magnitude of the excited voltages is, for example, about 4.5V. If the lamps L1-Ln are operating abnormally such as, for example, the turning off of lamps L1-Ln, the magnitude of the excited voltages is less than the predetermined voltage so that states of the excited voltages are at a low level. During a time that the lamps L1-Ln are operating abnormally, the magnitude of the excited voltages is, for example, about 1.15V. As a result, the current sensing unit 300 outputs the excited voltages as the sensing signal VS to the normal lighting determiner 400.

When each of the lamps L1-Ln is normally lighted, the voltage divider 410 of the normal lighting determiner 400 divides voltages from the current sensing unit 300 to decrease a magnitude of the voltages by producing divided voltages.

The divided voltages are applied to the adder 420. The adder 420 adds the divided voltages Vi (i=1, 2, ... n) and the added voltage represents an output voltage from the adder Vo and is about $$Vo = \sum_{i=1}^{n} \frac{1}{n} Vi.$$

The output voltage Vo from the adder 420 is an average of each of the output voltages from the voltage dividers DV1-DVn where, for example, the number of voltage dividers is n. During normal operation, the output voltage Vo from the adder 420 is at a high level and is supplied to the maximum value selector 430.

The maximum value selector 430 selects a larger value of two values from among the output voltage from the DC power supply source 440 and the output voltage Vo from the adder 420. If, for example, the output voltage Vo from the adder 420 is greater than the output voltage from the DC power supply source 440, then the maximum value selector 430 outputs the output voltage Vo from the adder 420 as the supply voltage for the NAND gate 450. Since a current consumed by the NAND gate 450 is a very small, it is possible to drive the NAND gate 450 by applying a low voltage outputted from the maximum value selector 430.

Meanwhile, when a supply voltage from an external source is not applied to the backlight assembly, output voltages from the metal plate sensors M1-Mn are all "0V," thus the output voltage Vo from the adder 420 is 0V. Therefore, the maximum value selector 430 applies the supply voltage from the DC power supply source 440 to the NAND gate 450. During a time that the output voltage Vo from the adder 420 is 0V, the supply voltage from the DC power supply source 440 may be about 2.5V to about 4.0V as defined by the first and second resistors R5 and R6. However, the supply voltage is not limited to values between 2.5V and 4V and may be varied.

When at least one of the lamps L1-Ln is broken or is not turned on, the output voltages from corresponding metal plate sensors M1-Mn become small compared to a normal state. As described above, the output voltages from the metal plate sensors M1-Mn if the lamps L1-Ln are operating normally are, for example, about 4.5V and the output voltages from the metal plate sensors M1-Mn if one of the lamps L1-Ln is operating abnormally are about 1.15V. In other words, if one of the lamps L1-Ln is operating abnormally the output voltages from the metal plate sensors M1-Mn decrease to about ¼ of a value corresponding to a case in which the lamps L1-Ln are operating normally.

If one lamp L1-Ln is turned off, the output voltage Vo from the adder 420 is $$Vo = V\left(1 - \frac{1}{n}\right).$$

V is an output voltage from the adder 420 when all lamps L1-Ln are normally turned on. When a total number of the lamps L1-Ln is more than 10, variation of the output voltage Vo from the adder 420 is less than 10% with respect to the output voltage V.

If the total number of the lamps L1-Ln is more than 10, the output voltage Vo from the adder 420 provides the supply voltage of the NAND gate 450, and a value of half of the supply voltage, i.e. half the output voltage Vo from the adder 420, is a threshold voltage of the NAND gate 450. Thus, when the output voltage Vo from the adder 420 decreases 10%, the threshold voltage decreases 5%. Therefore, the output voltage Vo from the adder 420 does not vary significantly. In other words, although one lamp L1-Ln is turned off, the NAND gate 450 is normally operated. However, the NAND gate 450 receives the output voltages from each of the metal plate sensors M1-Mn as input voltages. Accordingly, when at least one lamp L1-Ln is turned off, the NAND gate 450 outputs an output voltage with "0" or the low level, to apply as the determination signal DS to the inverter controller 500. Responsive to the determination signal DS, the inverter controller 500 transmits a control signal to the inverter 200 for turning off all of the lamps L1-Ln. The inverter 200 turns off the lamps L1-Ln by receiving the determination signal DS at the low level.

Figure 7:
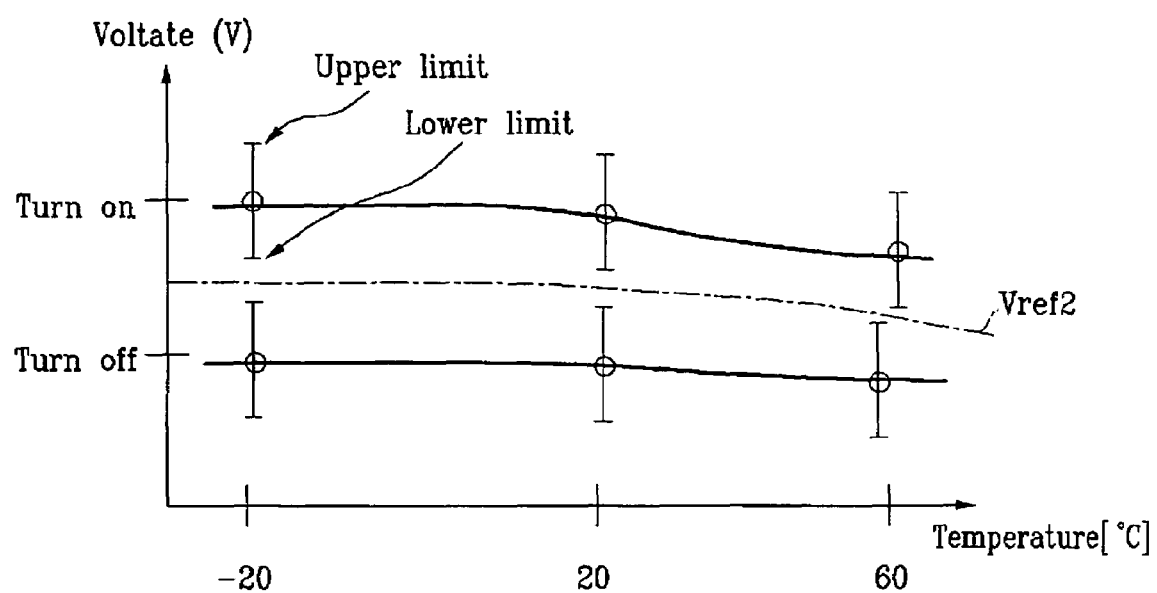
FIG. 7 is a graph illustrating a relationship between a voltage excited in a metal plate sensor and temperature according to the second embodiment of the present invention.

FIG. 7 is a graph illustrating a relationship between a voltage excited in a metal plate sensor and temperature according to this embodiment of the present invention.

As shown in FIG. 7, in response to an increase in temperature of each of the lamps L1-Ln or the backlight assembly due to ambient conditions, the output voltages from the metal plate sensors M1-Mn tend to decrease compared to a normal state. Accordingly, as described above, the output voltage Vo from the adder 420 decreases, thereby causing the supply voltage to the NAND gate 450 through the maximum value selector 430 to decrease correspondingly. As a result, since the threshold voltage (or reference voltage Vref2) of the NAND gate 450 decreases, as indicated by a curve labeled Vref2 in FIG. 7, a turning off of all lamps L1-Ln due to a rise in temperature does not occur.

During a process of assembling the backlight assembly, if distances between the lamps L1-Ln and the metal plate sensors M1-Mn are larger than the predetermined distance, the above-described embodiment may be applied. In addition, if a sensitivity of each of the metal plate sensors M1-Mn is different from each other, the above-described embodiment may also be applied.

Figure 8:
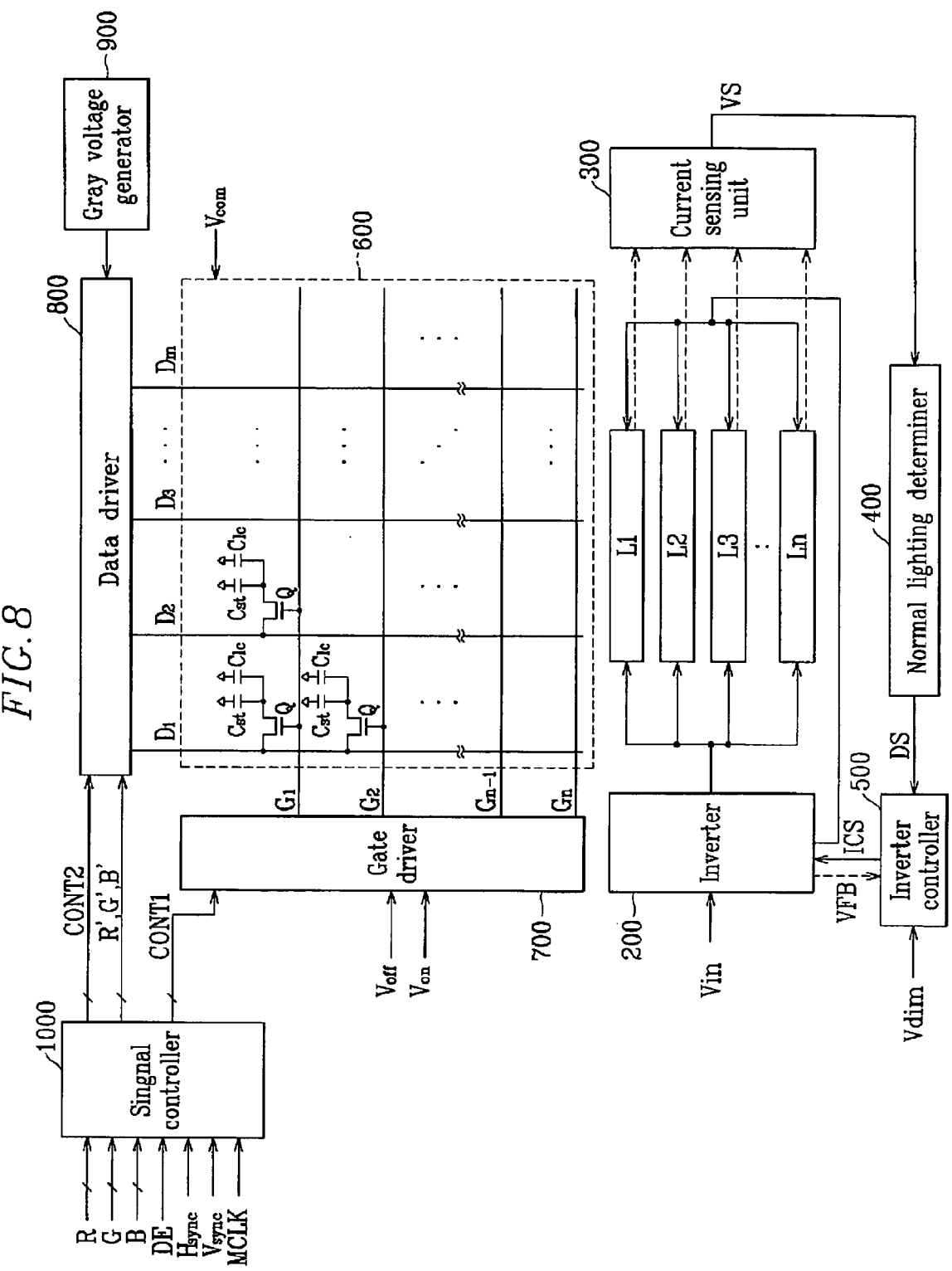
FIG. 8 is a block diagram of an LCD device according to an exemplary embodiment of the present invention.
Figure 9:
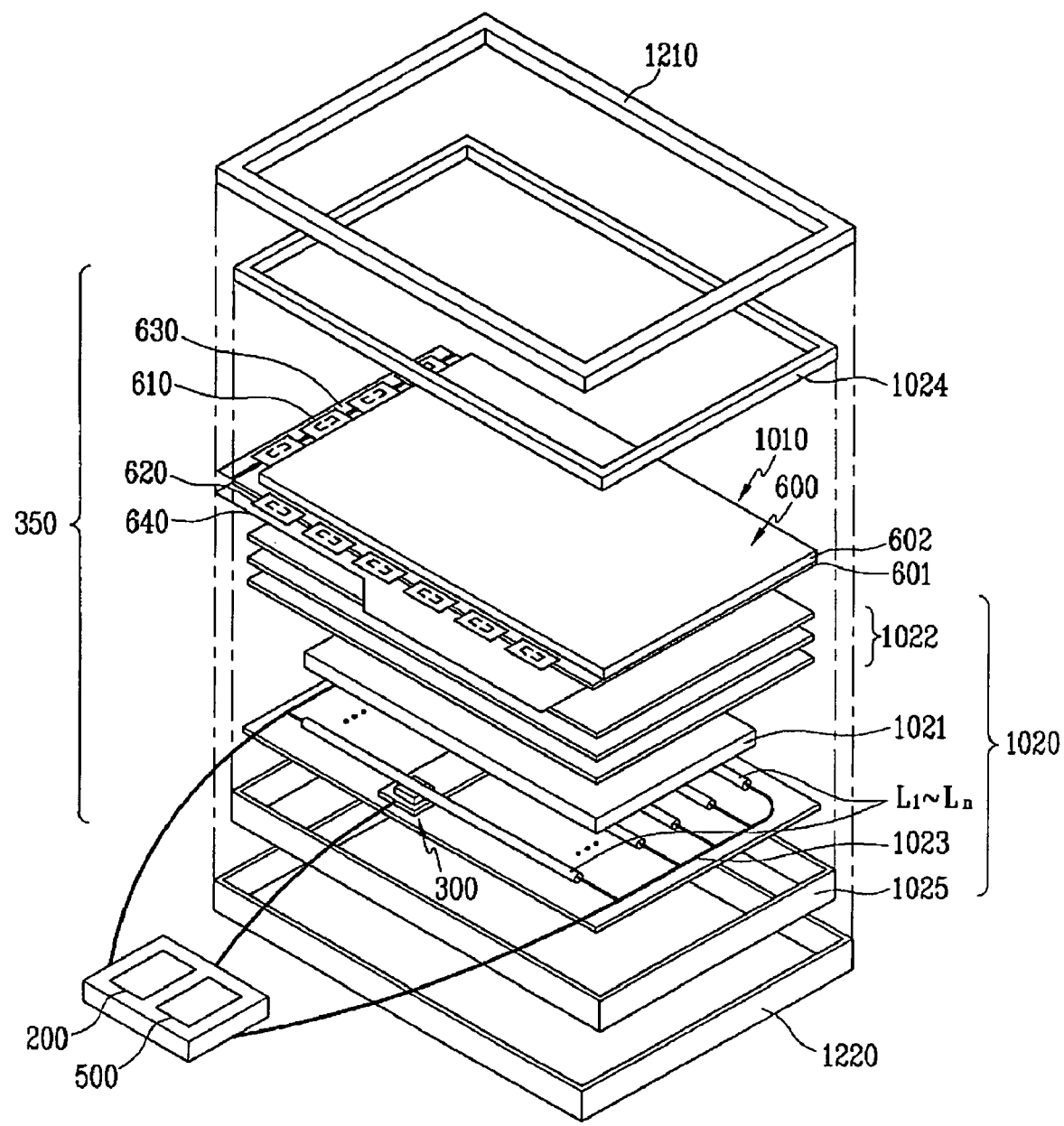
FIG. 9 is an exploded perspective view of an LCD device according to an exemplary embodiment of the present invention.
Figure 10:
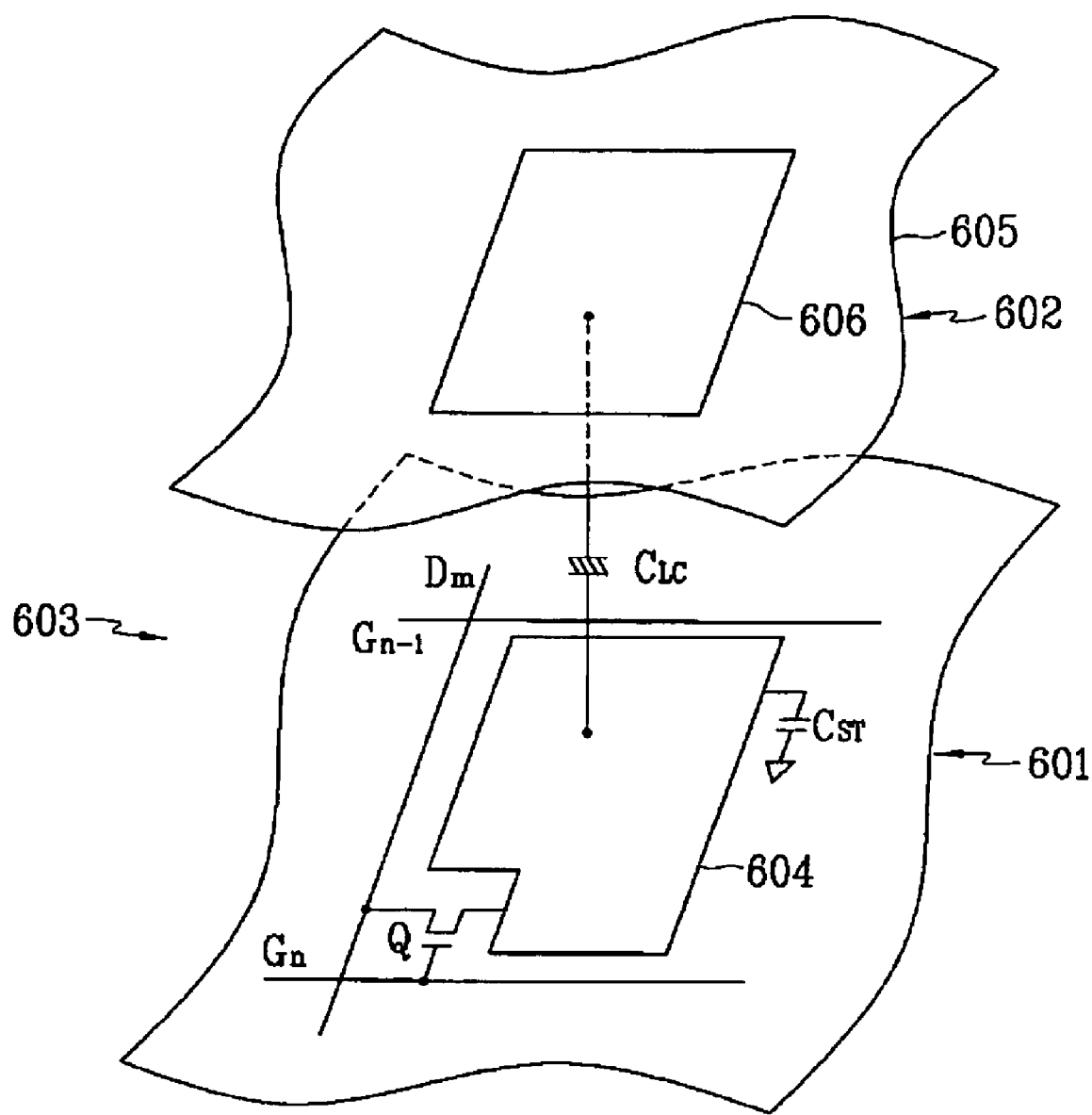
FIG. 10 is an equivalent circuit diagram of a pixel of the LCD device shown in FIG. 9.

FIG. 8 is a block diagram of an LCD device according to an exemplary embodiment of the present invention. FIG. 9 is an exploded perspective view of an LCD device according to an exemplary embodiment of the present invention. FIG. 10 is an equivalent circuit diagram of a pixel of the LCD device shown in FIG. 9.

An LCD device according to this exemplary embodiment of the present invention includes a backlight assembly having substantially a same configuration as shown in FIGS. 4 to 7. Therefore, elements performing same operations as in FIGS. 4 to 7 are indicated by the same reference numerals, and a detailed description thereof is omitted.

Referring to FIG. 8, an LCD device according to this embodiment of the present invention includes a liquid crystal (LC) panel assembly 600, a gate driver 700 and a data driver 800 electrically connected to the LC panel assembly 600, a gray voltage generator 900 electrically connected to the data driver 800, lamps L1-Ln emitting light toward the LC panel assembly 600, an inverter 200 connected to the lamps L1-Ln, a current sensing unit 300 sensing an excited voltage corresponding to each of the lamps L1-Ln, a normal lighting determiner 400 connected to the current sensing unit 300, an inverter controller 500 electrically connected to the normal lighting determiner 400 and the inverter 200, and a signal controller 1000 controlling the above-described elements.

Referring to FIG. 9, the LCD device also includes a display module 350 including a display unit 1010 and a backlight unit 1020, and a front case 1210 and a rear case 1220 containing the display module 350.

The display unit 1010 includes the LC panel assembly 600, a plurality of gate tape carrier packages (TCPs) or chip-on-film (COF) type packages 610 and a plurality of data TCPs 620 attached to the LC panel assembly 600, and a gate printed circuit board (PCB) 630 and a data PCB 640 attached to the gate and data TCPs 610 and 620, respectively.

The LC panel assembly 600 includes a lower panel 601, an upper panel 602, and a liquid crystal layer 603 disposed between the lower and upper panels 601 and 602, as shown in FIG. 10. As shown in FIG. 8, the LC panel assembly 600 includes display signal lines G1-Gn and D1-Dm and a plurality of pixels electrically connected to the display signal lines G1-Gn and D1-Dm and arranged substantially in a matrix.

The display signal lines G1-Gn and D1-Dm are disposed on the lower panel 601 and include gate lines G1-Gn transmitting gate signals (also referred to as "scanning signals") and data lines D1-Dm transmitting data signals. The gate lines G1-Gn extend substantially in a row direction and are substantially parallel to each other, while the data lines D1-Dm extend substantially in a column direction and are substantially parallel to each other.

Each of the pixels includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted if unnecessary.

The switching element Q that may be implemented as a thin film transistor TFT disposed on the lower panel 601. The switching element Q has three terminals: a control terminal connected to one of the gate lines G1-Gn; an input terminal connected to one of the data lines D1-Dm; and an output terminal connected to the LC capacitor $C_{LC}$ and the storage capacitor $C_{ST}$.

The LC capacitor $C_{LC}$ includes a pixel electrode 604 provided on the lower panel 601 and a common electrode 605 provided on an upper panel 602 as two terminals. The LC layer 603 disposed between the pixel and common electrodes 604 and 605 functions as a dielectric of the LC capacitor $C_{LC}$. The pixel electrode 604 is connected to the switching element Q, and the common electrode 605 is supplied with a common voltage Vcom and covers an entire surface of the upper panel 602. In an alternative embodiment to that shown in FIG. 10, the common electrode 605 may be provided on the lower panel 601, and both electrodes 604 and 605 may have shapes of bars or stripes.

The storage capacitor $C_{ST}$ is an auxiliary capacitor for the LC capacitor $C_{LC}$. The storage capacitor $C_{ST}$ includes the pixel electrode 604 and a separate signal line, which is provided on the lower panel 601, overlaps the pixel electrode 604 via an insulator, and is supplied with a predetermined voltage such as the common voltage Vcom. Alternatively, the storage capacitor $C_{ST}$ includes the pixel electrode 604 and an adjacent gate line called a previous gate line, which overlaps the pixel electrode 604 via an insulator.

For a color display, each pixel uniquely represents one of primary colors (i.e., spatial division) or each pixel sequentially represents the primary colors in turn (i.e., temporal division) such that a spatial or temporal sum of the primary colors is recognized as a desired color. An example of a set of the primary colors includes red, green, and blue colors. FIG. 10 shows an example of the spatial division in which each pixel includes a color filter 606 representing one of the primary colors in an area of the upper panel 602 facing the pixel electrode 604. Alternatively, the color filter 606 may be provided on or under the pixel electrode 604 on the lower panel 601.

One or more polarizers (not shown) are attached to at least one of the lower and upper panels 601 and 602.

The gray voltage generator 900 is disposed on the data PCB 640 and generates two sets of gray voltages related to a transmittance of the pixels. The gray voltages in a first set have a positive polarity with respect to the common voltage Vcom, while the gray voltages in a second set have a negative polarity with respect to the common voltage Vcom.

The gate driver 700 includes a plurality of integrated circuit (IC) chips mounted on the respective gate TCPs 610. The gate driver 700 is electrically connected to the gate lines G1-Gn of the LC panel assembly 600 and synthesizes a gate-on voltage Von and a gate off voltage Voff from an external device to generate gate signals for application to the gate lines G1-Gn.

The data driver 800 includes a plurality of IC chips mounted on the respective data TCPs 620. The data driver 800 is electrically connected to the data lines D1-Dm of the LC panel assembly 600 and applies data voltages selected from the gray voltages supplied from the gray voltage generator 900 to the data lines D1-Dm.

According to an exemplary embodiment of the present invention, the IC chips of the gate driver 700 or the data driver 800 are mounted on the lower panel 601. According to another exemplary embodiment, one or both of the drivers 700 and 800 are incorporated along with other elements into the lower panel 601. The gate PCB 630 and/or the gate TCPs 610 may be omitted in such embodiments.

The backlight unit 1020 is disposed under the LC panel assembly 600 and includes a spread plate 1021 and at least one optical sheet 1022 disposed under the lamps L1-Ln. The spread plate 1021 guides and diffuses light from the lamps L1-Ln to the LC panel assembly 600 and the optical sheet 1022 guides the diffused light toward the lamps L1-Ln. The backlight unit also includes a reflector 1023 disposed under the lamps L1-Ln and reflecting the light from the lamps L1-Ln toward the LC panel assembly 600. The backlight unit also includes an upper chassis 1024 and a lower chassis 1025 fixing the display module 350.

The lamps L1-Ln preferably include external electrode fluorescent lamps (EEFLs) having electrodes exposed on an external surface of the lamps L1-Ln. However, the lamps L1-Ln may include cold cathode fluorescent lamps (CCFLs) and flat fluorescent lamps (FFLs). A number of the lamps L1-Ln is determined in consideration of desired operating characteristics of the LCD device.

The inverter 200, the current sensing unit 300, the normal lighting determiner 400 and the inverter controller 500 may be mounted on a separate inverter PCB (not shown) or may be disposed on the gate PCB 630 or the data PCB 640.

The signal controller 1000 controls the gate and data drivers 700 and 800, and is disposed on the data PCB 640 or the gate PCB 630. The signal controller 1000 generates controlling signals to control the gate driver 700 and the data driver 800.

Operation of the LCD device will now be described in detail with reference to FIGS. 8 to 10.

Referring to FIG. 8, the signal controller 1000 is supplied with input image signals R, G and B and input control signals to control a display of the LCD device. The input control signals include, for example, a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the input image signals R, G and B suitable for operation of the panel assembly 600 in response to the input control signals and the input image signals R, G and B, the signal controller 1000 provides the gate control signals CONT1 for the gate driver 700, and processed image signals DAT and the data control signals CONT2 for the data driver 800.

The gate control signals CONT1 include a scanning start signal STV for instructing the gate driver 700 to start scanning and at least a clock signal for controlling the output time of the gate-on voltage Von. The gate control signals CONT1 may further include an output enable signal OE for defining a duration of the gate-on voltage Von.

The data control signals CONT2 include a horizontal synchronization start signal STH for informing the data driver 800 of a start of data transmission for a group of pixels, a load signal LOAD for instructing the data driver 800 to apply data voltages to the data lines D1-Dm, and a data clock signal HCLK. The data control signal CONT2 may further include an inversion signal RVS for reversing the polarity of the data voltages (with respect to the common voltage Vcom).

Responsive to the data control signals CONT2 from the signal controller 1000, the data driver 800 receives a packet of the processed image signals DAT for the group of pixels from the signal controller 1000, converts the processed image signals DAT into analog data voltages selected from the gray voltages supplied from the gray voltage generator 900, and applies the data voltages to the data lines D1-Dm.

The gate driver 700 applies the gate-on voltage Von to the gate line G1-Gn in response to the gate control signals CONT1 from the signal controller 1000, thereby turning on the switching elements Q connected to the gate line G1-Gn. The data voltages applied to the data lines D1-Dm are supplied to the pixels through turned on switching elements Q.

A difference between the data voltage and the common voltage Vcom applied to a pixel is expressed as a charged voltage of the LC capacitor $C_{LC}$, i.e., a pixel voltage. Liquid crystal molecules have orientations depending on a magnitude of the pixel voltage, and their orientations determine polarization of light passing through the LC layer 603. A change of the polarization is converted into a change of light transmittance by the polarizers.

By repeating the above-described procedure each unit of a horizontal period (which is denoted by "1H" and equal to one period of the horizontal synchronization signal Hsync and the data enable signal DE), all gate lines G1-Gn are sequentially supplied with the gate-on voltage Von during a frame, thereby applying the data voltages to all pixels sequentially. When the next frame starts after finishing one frame, the inversion control signal RVS applied to the data driver 800 is controlled such that a polarity of the data voltages is reversed (which is referred to as "frame inversion"). The inversion control signal RVS may be also controlled such that the polarity of the data voltages flowing in a data line in one frame are reversed (for example, line inversion and dot inversion), or the polarity of the data voltages in one packet are reversed (for example, column inversion and dot inversion).

According to exemplary embodiments of the present invention, since a plurality of lamps connected in parallel to each other are controlled by one inverter, an associated cost decreases and a volume and weight of a backlight assembly are decreased. Thus, total volume and weight of products associated with the backlight assembly are also decreased.

Additionally, lamps connected in parallel with each other and controlled by one inverter may be disposed proximate to metal plate sensors that sense an operating state of the lamps and allow for control of the operation of the lamps in response to the operating state.

While the present invention has been described in detail with reference to exemplary embodiments, it should be understood that the present invention is not limited to the disclosed embodiments, but, on the contrary, is intended to cover various modifications and equivalent arrangements included within the sprit and scope of the appended claims.

What is claimed is:

1. A backlight assembly device comprising:
   lamps;
   an inverter applying a control signal to the lamps to control operation of the lamps;
   a sensing unit outputting sensing voltages in response to currents flowing in the lamps;
   a normal lighting determiner comparing the sensing voltages to a reference voltage for determining an operating state of the lamps to output a determination signal, the normal lighting determiner varying the reference voltage in response to a change in the operating state of the lamps; and
   an inverter controller outputting the control signal in response to the determination signal.

2. The device of claim 1, wherein the sensing unit comprises:
   sensors generating excited voltages in response to the current flowing in the lamps to output as the sensing voltages; and
   a substrate having signal lines and transmitting the excited voltages through the signal lines.

3. The device of claim 2, wherein each of the sensors comprises a metal plate sensor.

4. The device of claim 1, wherein the normal lighting determiner comprises:
   a first voltage divider dividing the sensing voltages to output divided voltages;
   an adder adding the divided voltages to output an added voltage;
   a voltage selector selecting one of the added voltage and a power supply voltage to output as a supply voltage; and
   a logic circuit receptive of the supply voltage and generating the determination signal.

5. The device of claim 4, further comprising a power supply source applying the power supply voltage to the voltage selector.

6. The device of claim 5, wherein the power supply source comprises a second voltage divider.

7. The device of claim 5, wherein the voltage selector comprises a first diode electrically connected to the adder and a second diode electrically connected to the power supply source.

8. The device of claim 4, wherein the first voltage divider comprises a plurality of first resistors and a second resistor electrically connected the plurality of first resistors.

9. The device of claim 4, wherein the adder comprises:
an input resistor;
a feedback resistor;
a feedback capacitor;
an output capacitor; and
an operational amplifier having a negative feedback connection via the feedback resistor and the feedback capacitor,
wherein the input resistor is electrically connected with an input of the operational amplifier and the output capacitor is electrically connected with an output of the operational amplifier.

10. The device of claim 4, wherein the logic circuit is a NAND gate.

11. The device of claim 1, wherein the lamps comprise external electrode fluorescent lamps.

12. The device of claim 1, wherein the reference voltage decreases in response to an increase in temperature.

13. A display device comprising:
pixels;
a light source having lamps;
an inverter applying a control signal to the lamps and controlling the lamps;
a sensing unit outputting sensing voltages in response to currents flowing in the lamps;
a normal lighting determiner comparing the sensing voltages to a reference voltage for determining an operating state of the lamps to output a determination signal and varying the reference voltage in response to a change in temperature of the lamps; and
an inverter controller outputting the control signal in response to the determination signal.

14. The device of claim 13, wherein the sensing unit comprises sensors generating exited voltages in response to the currents flowing in the lamps to output as the sensing voltages.

15. The device of claim 13, wherein the normal lighting determiner comprises:
a first voltage divider dividing the sensing voltages to output divided voltages;
an adder adding the divided voltages to output an added voltage;
a voltage selector selecting one of the added voltage and a power supply voltage to output as a supply voltage; and
a logic circuit receptive of the supply voltage and generating the determination signal.

16. The device of claim 15, further comprising a power supply source applying the power supply voltage to the voltage selector.

17. The device of claim 16, wherein the power supply source comprises a second voltage divider.

18. The device of claim 16, wherein the voltage selector comprises a first diode electrically connected to the adder and a second diode electrically connected to the power supply source.

19. The device of claim 15, wherein the first voltage divider comprises a plurality of first resistors and a second resistor electrically connected the first resistors.

20. The device of claim 15, wherein the adder comprises:
an input resistor;
a feedback resistor;
a feedback capacitor;
an output capacitor; and
an operational amplifier having a negative feedback connection through the feedback resistor and the feedback capacitor,
wherein the input resistor is electrically connected with an input of the operational amplifier and the output capacitor is electrically connected with an output of the operational amplifier.

21. The device of claim 15, wherein the logic circuit is a NAND gate.

22. The device of claim 13, wherein the device is a liquid crystal display device.

23. The device of claim 13, wherein the reference voltage decreases in response to an increase in temperature.

24. A driving apparatus of a light source for a display device including a plurality of pixels, the light source including a plurality of lamps, the apparatus comprising:
an inverter applying a control signal to the lamps and controlling the lamps;
a sensing unit outputting sensing voltages in response to currents flowing in the lamps;
a normal lighting determiner comparing the sensing voltages to a reference voltage for determining an operating state of the lamps to output a determination signal and varying the reference voltage in response to a change in temperature of the lamps; and
an inverter controller outputting the control signal in response to the determination signal.

* * * * *